(12) United States Patent
Heigl et al.

(10) Patent No.: US 6,241,277 B1
(45) Date of Patent: Jun. 5, 2001

(54) SIDE IMPACT PROTECTION DEVICE

(75) Inventors: Jürgen Heigl, Böbingen; Franz Öhlert, Aalen-Hofen, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/517,300

(22) Filed: Mar. 2, 2000

(30) Foreign Application Priority Data

Mar. 2, 1999 (DE) .......................................... 299 03 778 U

(51) Int. Cl.[7] ..................................................... B60R 21/22
(52) U.S. Cl. ........................................ 280/730.2; 280/749
(58) Field of Search ............................. 280/730.1, 730.2, 280/749

(56) References Cited

U.S. PATENT DOCUMENTS

| | | | | |
|---|---|---|---|---|
| 3,687,485 | * | 8/1972 | Campbell | 280/733 |
| 5,265,903 | * | 11/1993 | Kuretake et al. | 280/730.2 |
| 5,462,308 | * | 10/1995 | Seki et al. | 280/749 |
| 5,636,862 | * | 6/1997 | Cheung et al. | 280/730.2 |
| 5,707,075 | * | 1/1998 | Kraft et al. | 280/730.2 |
| 5,788,270 | * | 8/1998 | HÅland et al. | 280/729 |
| 5,975,566 | * | 11/1999 | Bocker et al. | 280/730.2 |
| 6,095,551 | * | 8/2000 | O'Docherty | 280/730.2 |

* cited by examiner

Primary Examiner—Paul N. Dickson
(74) Attorney, Agent, or Firm—Tarolli, Sundheim, Covell, Tummino & Szabo L.L.P.

(57) ABSTRACT

A side impact protection device comprises a gas bag adapted to be translated from a folded condition into an unfolded condition, and a tensioning device. The tensioning device has a traction apparatus with a first and a second end. The first end is connected to the gas bag at a first region and the second end is connected to the gas bag at a second region which is different from the first region. The side impact protection device further comprises at least two deflection points for the traction apparatus. The traction apparatus extends from the first region via the deflection points towards the second region.

10 Claims, 3 Drawing Sheets

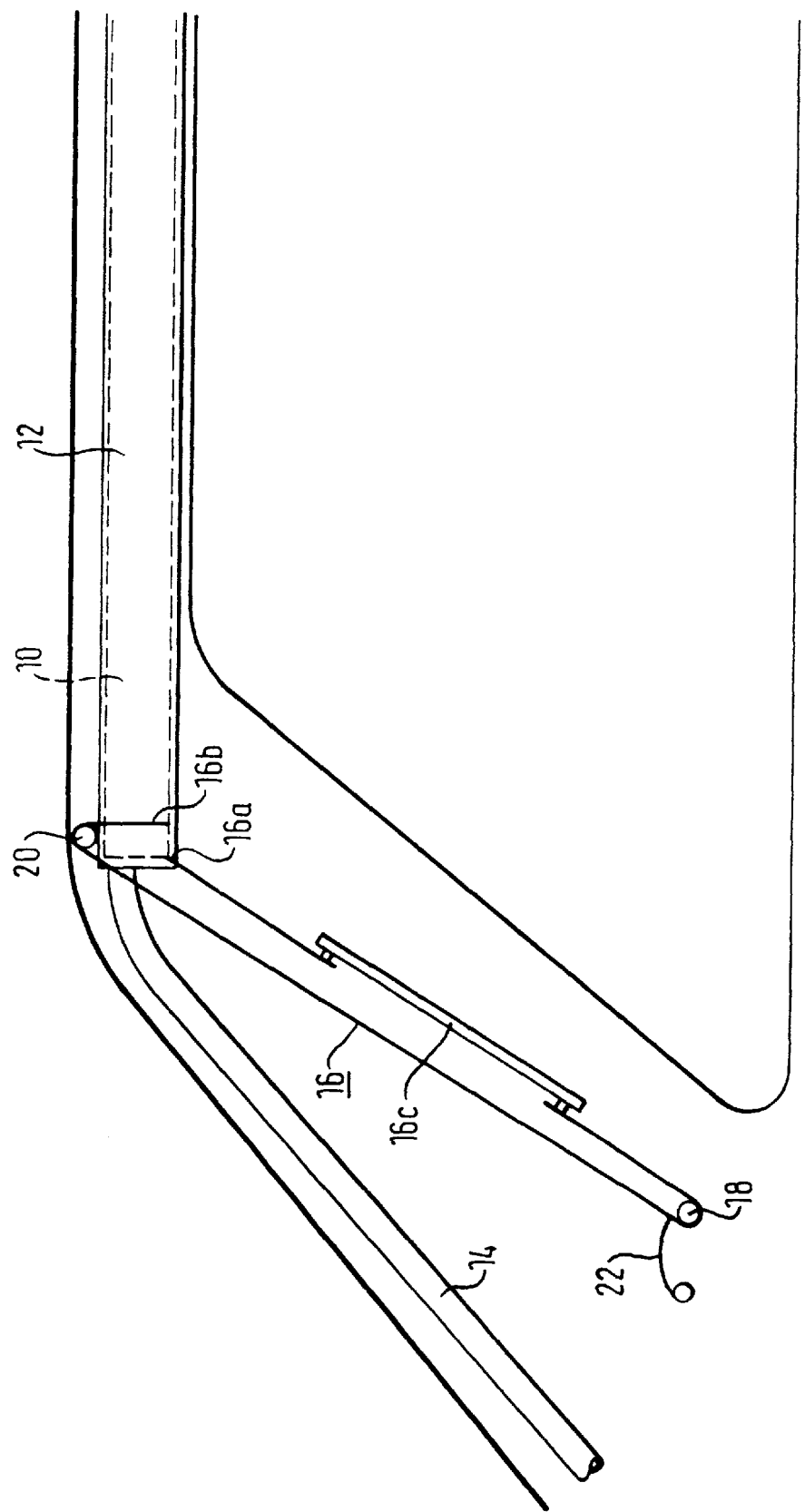

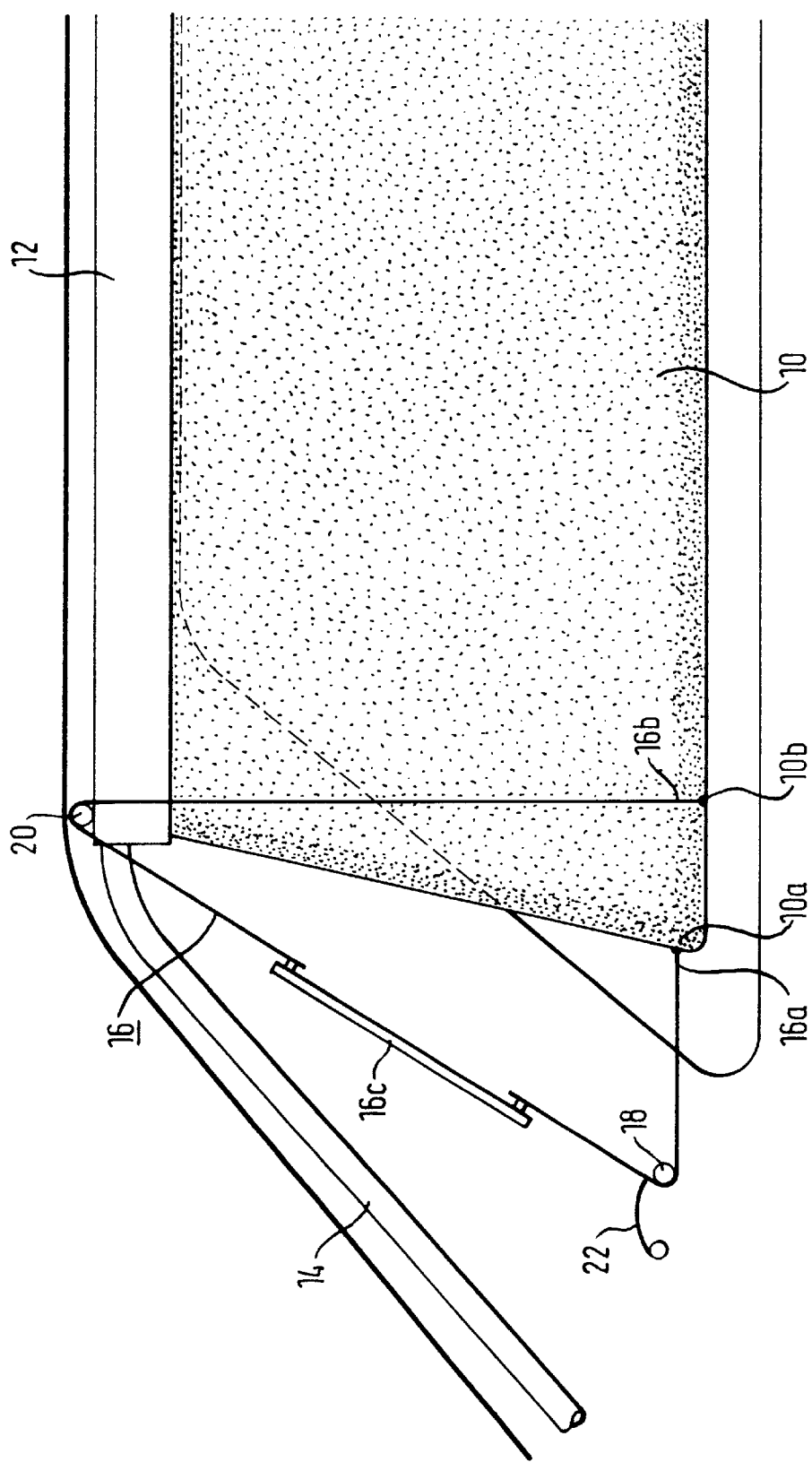

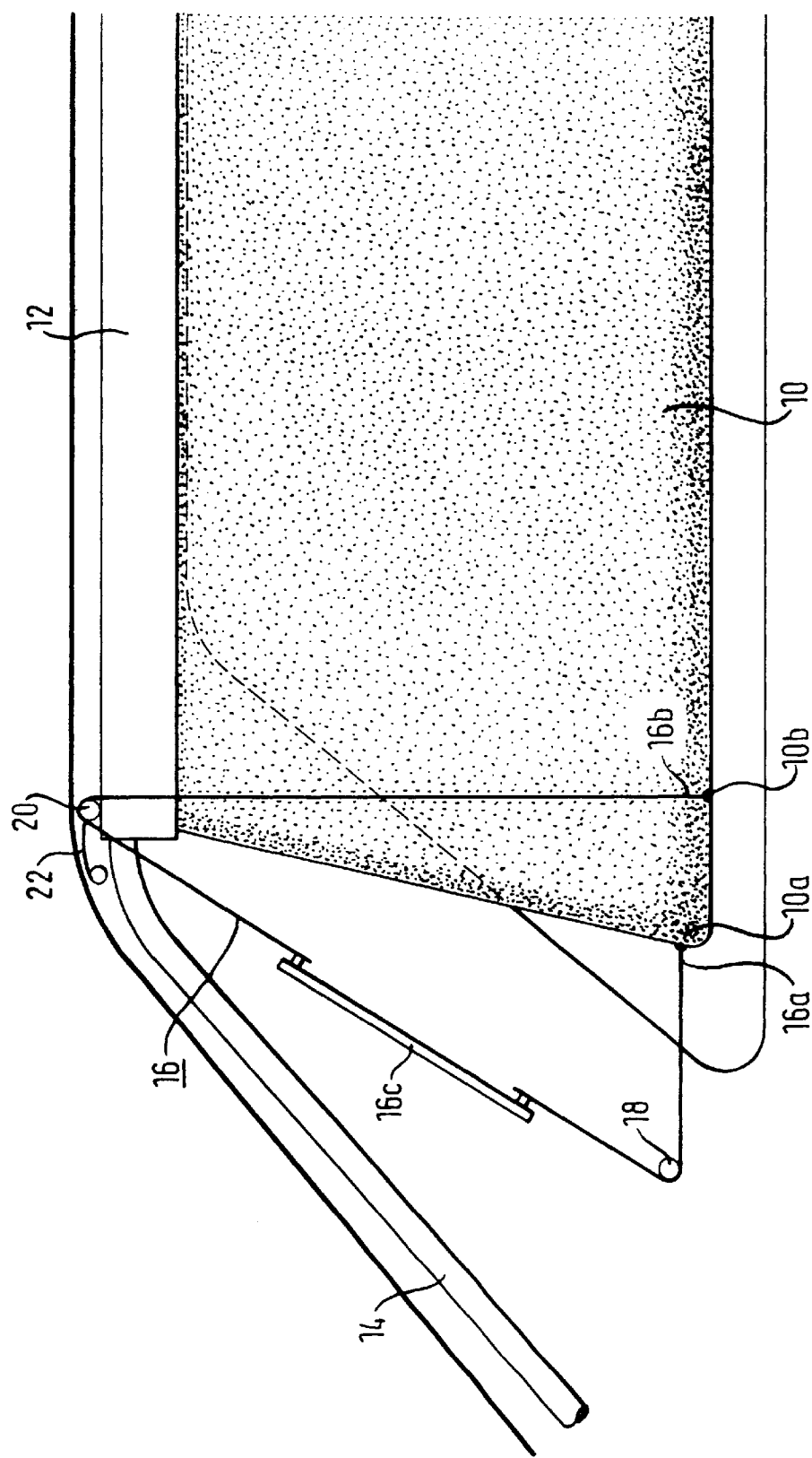

SIDE IMPACT PROTECTION DEVICE

BACKGROUND OF THE INVENTION

Typical side impact protection devices comprise a gas bag which in the inflated state at least partially covers a side window of a vehicle, and a tensioning device which via a traction means engages at the gas bag.

A gas bag of such a side impact protection device is tensioned in the inflated state generally between the A- and C-column of the vehicle. Thereby, a correct positioning of the unfolded gas bag is achieved, which is subjected to a contraction in length through the increase in volume on inflating. Furthermore, the tensioning device ensures that the gas bag also still offers a protection effect in a side impact when the compressed gas has already partially escaped from the gas bag and the gas bag slackens. This can be caused by an outflow of gas, directed to specific objectives, to decrease impact energy or by a possible damage to the gas bag during the accident. Even in the case of gas bags which are impermeable to gas, it is not ensured that for example after a preceding impact or in the case of a somersaulting of the vehicle, in which a plurality of contacts between the vehicle occupant and the gas bag can occur, the internal pressure in the gas bag maintains an optimum value. Finally, the cooling of the gas in the gas bag also leads to a reduction of the internal pressure. Clamping devices, known hitherto, with tensioning bands, which on the one hand are connected with the gas bag and on the other hand are connected fixed with the vehicle, use for example tensioned spring elements, band tensioners or gas-pressure-driven pistons, in order to achieve an active tensioning of the bands and hence of the gas bag. A disadvantage in such devices is that they are relatively costly and expensive components are required. In addition, in most cases a separate release device must be provided.

BRIEF DESCRIPTION OF THE INVENTION

The invention provides a side impact protection device with a tensioning device for a gas bag which provides in a simple manner for the gas bag to also be held under tension in the evacuated state.

The side impact protection device according to the invention comprises a gas bag adapted to be translated from a folded condition into an unfolded condition, and a tensioning device. The tensioning device has a traction means with a first and a second end. The first end is connected to the gas bag at a first region and the second end is connected to the gas bag at a second region which is different from the first region. The side impact protection device further comprises at least two deflection points for the traction means. The traction means extends from the first region via the deflection points towards the second region. Hence it is achieved that the gas bag automatically tensions itself through its unfolding, so that a separate device is not necessary for activating the tensioning device. The required components are not very delicate, in particular because no electrical components are required.

Preferably, the traction means is provided with a return stop. The return stop ensures that the tensioned gas bag also provides an effective support under load and hence also a protection against lateral impact in the evacuated state.

There are particular advantages if the traction means has an elastic region. Thereby, a reliable anchoring of the gas bag is achieved independently of its internal pressure over a lengthy period of time, without the traction means being excessively stressed. With a non-unfolded gas bag, the elastic region is not stressed, so that aging effects such as the weakening of the elasticity are avoided. The provision of the elastic region in the traction means also makes it possible, furthermore, with a suitable arrangement of the return stop, to rescue the occupants from the vehicle without a great effort, because the gas bag can be pushed away easily against the resistance of the elastic region.

According to an embodiment of the invention, the articulation points fixed to the vehicle and the traction means guided around them are arranged such that the traction means is deflected about more than 180°. Thereby, for example, in the case of a gas bag which unfolds downwards from the roof edge of the vehicle, a tensioning force onto the gas bag can be achieved, directed forwards with respect to the vehicle. An optimum conversion results when the traction means each engages on a rim region of the gas bag.

The said aim of the invention is also achieved with a gas bag for a side impact protection device on which a traction means is arranged, the traction means being connected with two different regions of the gas bag.

Advantageous developments of the gas bag according to the invention will be apparent from the corresponding sub-claims.

BRIEF DESCRIPTION OF THE DRAWINGS

Further characteristics of the invention will be apparent from the following description with reference to the enclosed drawings. In the drawings:

FIG. 1 shows diagrammatically a tensioning device for a side impact protection device with a gas bag in non-activated state;

FIG. 2 shows the tensioning device of FIG. 1 in activated state; and

FIG. 3 shows a different tensioning device in activated state. protection device.

DETAILED DESCRIPTION OF THE INVENTION

In FIG. 1 a side impact protection device in a vehicle is shown in which a gas bag 10 is accommodated in an ejection channel 12 on the roof edge of a vehicle. The gas bag 10 can be inflated by the gas of a compressed gas source or of a gas generator (not shown) via a gas lance 14. At its front lower end 10a the gas bag 10 is connected with a first end 16a of a traction means 16 (see FIG. 2). With the gas bag folded together, the traction means 16 extends forwards obliquely downward to a first articulation point 18 fixed to the vehicle, which is situated in the lower region of the A-column laterally adjacent to the front side window. There, the traction means 16 is deflected upwards substantially about 180°. Via a second deflection point 20, fixed to the vehicle, above the side window in the region of the front end of the ejection channel 12, the traction means 16 is deflected once more, this time downwards. The second end 16b of the traction means 16 is connected at a point 10b with the lower rim of the gas bag 10 which lies further to the back in the direction of the vehicle than the connection point 10a of the first end 16a of the traction means 16 (see FIG. 2). Close to the first deflection point 18, a return stop 22 for the traction means 16 is arranged, which does not permit a movement of the traction means 16 anticlockwise about the deflection point 18. A clamping wedge is suitable, for example, as return stop. The traction means 16 has over a particular length a region 16c which is elastic.

FIG. 2 shows the side impact protection device of FIG. 1 in the released state. The gas bag 10 has unfolded downwards through the inflating and covers the front side window almost completely. Through the displacement of the lower rim of the gas bag 10, the second end 16b of the traction means 16, which is connected with the lower rim of the gas bag 10, is accordingly also pulled downwards and transfers the traction resulting therefrom via the two deflection points 18 and 20 onto the front lower end 10a of the gas bag 10, which is connected with the first end 16a of the traction means 16. In so doing, the traction means 16 as a whole is deflected through approximately 270°, so that the traction at the front lower end 10a of the gas bag 10 acts towards the front in the direction of the vehicle. Through the shortening of the air bag in longitudinal direction, as a result of the increase in volume on inflation, a further traction acts on the front lower end 10a of the gas bag 10, which is opposed to the previously mentioned traction. Owing to the tension thus generated in the traction means 16, its elastic region 16c is extended and operates as an energy store.

If the internal pressure in the gas bag 10 decreases for one of the previously mentioned reasons and a slackening of the gas bag 10 occurs, the energy stored in the elastic region 16c of the traction means 16 brings about an elastic recovery of this region 16c, so that the first end 16a of the traction means 16 and hence the front lower end 10a of the gas bag 10 is acted upon by a forwardly directed force in the direction of the vehicle. The return stop 22, arranged in the region of the first deflection point 18 according to FIG. 2, prevents the front lower end 10a of the gas bag 10 from being able to move away towards the rear in the direction of the vehicle. Thereby, it is ensured that the gas bag 10 continues to cover the front region of the side window and remains in a taut state with respect to its longitudinal direction. In addition, through the return stop 22, an undesired tension onto the unfolded gas bag 10 between the two connection points 10a and 10b is avoided. Hence the gas bag 10 also offers an effective support in the partially evacuated state in the case of a side impact.

In FIG. 3, a side impact protection device is shown, with a tensioning device for a gas bag in activated state, which largely corresponds to that shown in FIGS. 1 and 2. The difference consists in that the return stop 22 is not arranged here in the region of the first deflection point but rather in the region of the second deflection point 20. The return stop 22 does not permit any movement of the traction means 16 anticlockwise about the deflection point 20. Thereby it is prevented that after the releasing of the side impact protection device an upwardly directed traction, caused by the elastic recovery of the elastic region 16c of the traction means 16, is exerted onto the lower rim of the gas bag 10, which could draw the gas bag 10 away upwards and hence could impair the protection effect. On the other hand, the gas bag 10 can be moved upwards through the external action in the direction of the vehicle roof without difficulty, to rescue the vehicle occupants, with such an arrangement of the return stop 22, against the resistance of the elastic region 16c in the traction means 16.

A further embodiment (not shown in the Figures) of the side impact protection device according to the invention likewise largely corresponds to the embodiment shown in FIGS. 1 and 2. Of course, two return stops 22 are provided, the one being arranged in the region of the first deflection point and the other in the region of the second deflection point 18 and 20 respectively, and both have the corresponding effect as in the embodiments of FIGS. 1 and 2 and 3, respectively, described above. With this embodiment, having two return stops 22, the position of the gas bag 10 can not be influenced after its unfolding, because a displacement toward the rear in the direction of the vehicle or upwards is eliminated by the two return stops 22.

The described tensioning devices, each arranged in the region of the A-column, can be used in an analogous manner also in the rear region of the vehicle (C/D column), so that the traction means engages on the rear region of the gas bag. Also a combination of one tensioning device arranged in the front region of the vehicle and one arranged in the rear region of the vehicle is possible.

What is claimed is:

1. A side impact protection device comprising a gas bag adapted to be translated from a folded condition into an unfolded condition, a tensioning device, said tensioning device having a traction means with a first and a second end, said first end being connected to said gas bag at a first region and said second end being connected to said gas bag at a second region which is different from said first region, and comprising at least two deflection points for said traction means, said traction means extending from said first region via said deflection points towards said second region.

2. The protection device according to claim 1, comprising a return stop engaging on said traction means.

3. The protection device according to claim 1, wherein said traction means has an elastic region.

4. The protection device according to claim 1, wherein said deflection points and said traction means are arranged such that said traction means is deflected by more than 180°.

5. The protection device according to claim 1, wherein said deflection points and said traction means are arranged such that said traction means is deflected by more than 270° when said gas bag is unfolded.

6. The protection device according to claim 1, wherein a first of said deflection points is adapted to be arranged in the region of a side adjacent to a side window and a second of said deflection points is adapted to be arranged in a region above said side window.

7. The protection device according to claim 1, wherein said first and said second regions are situated on a rim region of said gas bag.

8. A gas bag for a side impact protection device, comprising a traction means with a first and a second end, said first end being connected to said gas bag at a first region and said second end being connected to said gas bag at a second region which is different from said first region, a closed loop being formed by said first end and said second end of said traction means being connected to said gas bag.

9. The gas bag according to claim 8, wherein said first end of said traction means is fastened to a lower rim of said gas bag and said second end is fastened to a lateral rim of said gas bag.

10. The gas bag according to claim 8, wherein said traction means has an elastic region.

* * * * *